United States Patent
Hunt et al.

(10) Patent No.: US 6,296,097 B1
(45) Date of Patent: Oct. 2, 2001

(54) HYDRAULICALLY ACTUATED AXLE DISCONNECT

(75) Inventors: William Gordon Hunt; Thomas Lee Redding, both of Roanoke, IN (US)

(73) Assignee: Spicer Technologies, Inc., Fort Wayne, IN (US)

( * ) Notice: Subject to any disclaimer, the term of this patent is extended or adjusted under 35 U.S.C. 154(b) by 0 days.

(21) Appl. No.: 09/471,157

(22) Filed: Dec. 23, 1999

(51) Int. Cl.$^7$ .................................................. F16D 11/10
(52) U.S. Cl. ....................... 192/69.9; 192/85 CA; 192/86
(58) Field of Search ................. 192/69.9, 86, 85 CA

(56) References Cited

U.S. PATENT DOCUMENTS

| | | |
|---|---|---|
| 3,973,450 | 8/1976 | Shealy . |
| 4,167,881 | 9/1979 | Bell et al. . |
| 4,595,087 | 6/1986 | Morisawa et al. . |
| 4,627,512 | 12/1986 | Clohessy . |
| 4,817,752 | 4/1989 | Lobo et al. . |
| 4,960,192 * | 10/1990 | Kurihara ........................ 192/85 V X |
| 5,386,989 | 2/1995 | Weilant et al. . |
| 5,566,805 | 10/1996 | Sommer . |
| 5,950,785 * | 9/1999 | Adachi et al. ..................... 195/86 X |
| 6,000,518 * | 12/1999 | Koskinen ................................ 192/86 |
| 6,079,539 * | 6/2000 | Fetcho et al. ................... 192/69.9 X |

* cited by examiner

Primary Examiner—Charles A Marmor
Assistant Examiner—Saúl Rodriguez
(74) Attorney, Agent, or Firm—Liniak, Berenato, Longacre & White

(57) ABSTRACT

An axle disconnect assembly for a vehicle having an input shaft and a coaxially arranged output shaft. A collar is splined to one of the shafts and is slidable to selectively engage the other shaft to establish a positive driving connection between the input and output shafts. A movable piston engages the collar to selectively position the collar. A valve is in communication with the vehicle's existing oil pump and is controlled to selectively supply pressurized oil to opposite sides of the piston to selectively displace the piston thereby selectively controlling the position of the collar and the connection between the shafts.

9 Claims, 3 Drawing Sheets

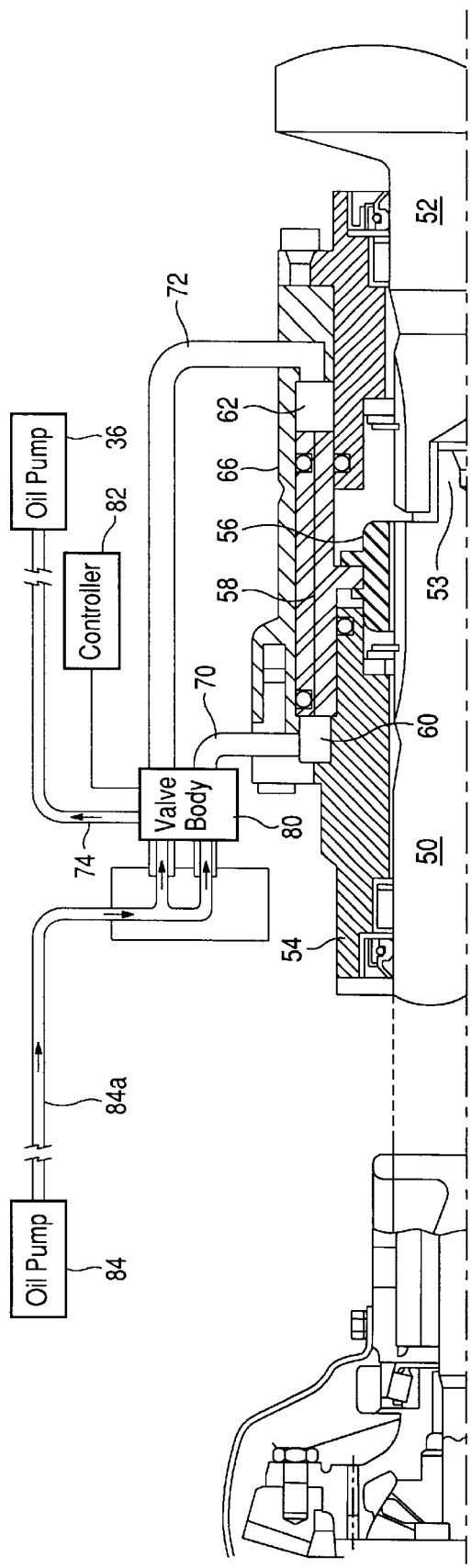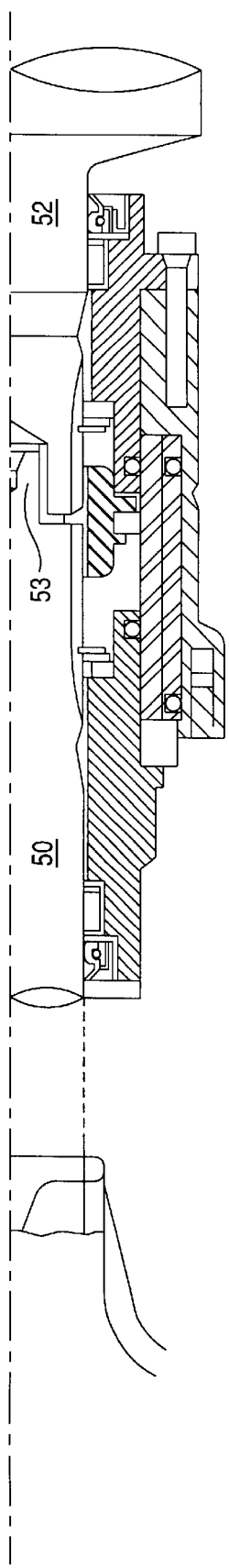

HYDRAULICALLY ACTUATED AXLE DISCONNECT

BACKGROUND OF THE INVENTION

1. Field of the Invention

The present invention is directed to a hydraulically actuated axle disconnect and is more particularly directed to an axle disconnect utilizing a vehicle's existing oil pump to provide pressurized lubricating oil as an actuating fluid, and integral with the engine oil pan.

2. Description of the Related Art

It is known to provide a part time four wheel drive vehicle that includes an axle disconnect mechanism in a front axle assembly. Such axle disconnect mechanisms include a vacuum motor and a shift fork assembly. The vacuum motor communicates with a vacuum source that is controlled by a two position solenoid valve. The fork shift assembly under control of the vacuum motor controls the axial shifting of a clutch collar between positions corresponding to coupled and uncoupled operating modes.

This conventional system has the drawback of an externally mounted vacuum motor that requires considerable extra space particularly when vehicle suspension travel is taken into account. The use of an externally mounted vacuum motor also necessitates the use of a fork shift assembly which adds to the cost and complexity of the prior art arrangement exemplified by this system.

It is also known that a part time four wheel drive vehicle may include an axle disconnect in the front axle assembly, wherein the axle disconnect is operated by a power shift mechanism. The power shift mechanism includes sealed envelopes in the form of expandable and contractible compartments that shift the axle disconnect into and out of engagement in response to a remote control valve. The sealed envelopes are offset from the axle housing. The shiftable drive gear couples and uncouples inner and outer drive shafts.

This power shift mechanism requires two sealed envelopes and numerous other parts operatively connecting the sealed envelopes with the shiftable drive gear. Moreover, such prior art axle disconnect systems do not provide a modular arrangement necessary for easy of manufacture, assembly and repair. Consequently these prior art arrangements are also complex and expensive to produce particularly when the difficulty of assembly is taken into account.

The need therefore exists for an axle disconnect arrangement and design that is simple in design, compact in construction and economical to package and manufacture.

SUMMARY OF THE INVENTION

It is an object of the present invention to provide an axle disconnect that improves upon the related art.

The present invention is directed to an axle disconnect assembly for a vehicle having an input shaft and a coaxially arranged output shaft. A collar is splined to one of the shafts and is slidable to selectively engage the other shaft to establish a positive driving connection between the input and output shafts. A movable piston engages the collar to selectively position the collar. A valve is in communication with the vehicle's existing oil pump and is controlled to selectively supply pressurized oil to opposite sides of the piston to selectively displace the piston thereby selectively controlling the position of the collar and the connection between the shafts.

These and other features of the present invention will become more apparent with reference to the following drawings and description associated therewith.

BRIEF DESCRIPTION OF THE DRAWINGS

FIGS. 2a & 2b are sectional views of the axle disconnect in different positions according to the present invention.

DESCRIPTION OF THE PREFERRED EMBODIMENT

Figure 1:
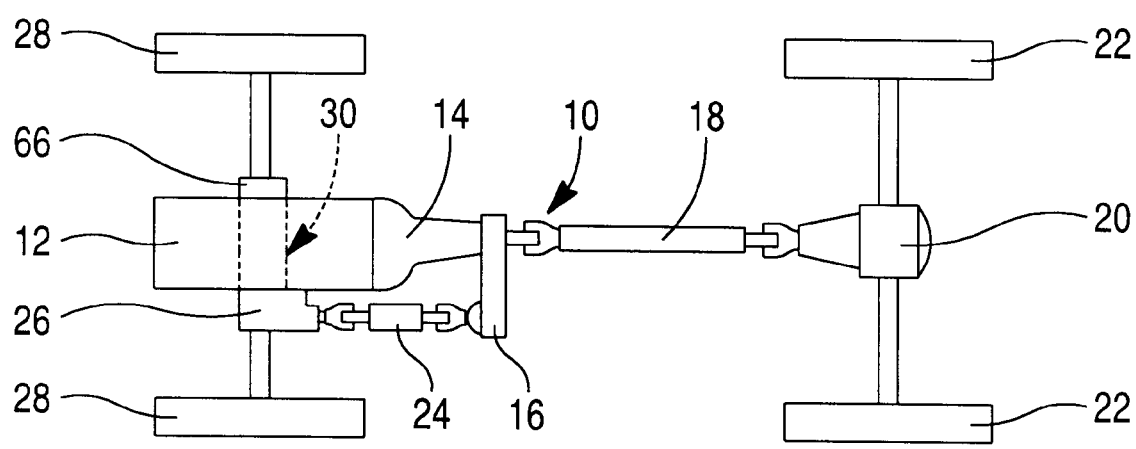
FIG. 1 is a schematic plan view of a part time four wheel drive vehicle.

Referring now to the drawings and more particularly to FIG. 1, there is shown a schematic plan view of a part time four wheel drive vehicle 10 comprising engine 12, transmission 14 and transfer case 16 mounted on a vehicle chassis (not shown). The engine 12 and transmission 14 are conventional and well known components as is the transfer case 16 which typically includes an input shaft, a main output shaft and an auxiliary output shaft. The main output shaft is drive connected to the input shaft by a clutch or the like in the transfer case 16 and customarily offset from the transfer case. The clutch is actuated by a suitable selector mechanism controlled by the vehicle driver. The internal details of the transfer case 16 and details of a selector mechanism are not shown because these are conventional and well known components.

The main output shaft is drivingly connected to a rear drive shaft 18 which in turn is drivingly connected to a rear differential of a rear drive axle 20 that drives rear wheels 22 in a well known manner.

The auxiliary output shaft is drivingly connected to a front drive shaft 24 which in turn is drivingly connected to a front differential of a front drive axle 26 for selectively driving front wheels 28.

This invention relates to an auxiliary drive axle, such as the front drive axle 26 and more particularly to a axle disconnect for such a drive axle that is generally indicated by reference numeral 30 in FIG. 1.

To disconnect input drive axle 30 stemming from a differential from an output shaft that is in driving connection with the wheels 28.

FIGS. 2a & 2b are directed to the axle disconnect assembly of the present invention. An input shaft 50 emerges from a differential assembly or other conventional gear assembly as in known in the art. The input shaft 50 is rotatably connected within an axle housing 54. Similarly, the output shaft 52 is rotatably disposed within the axle housing 54 adjacent the input shaft 50. In the preferred embodiment, the input shaft 50 has an extension 51 rotatably disposed within a bore 52 of the output shaft 52 to provide a more stable structure. An annular collar 56 is non rotatably and translatably disposed about the input shaft 50. Preferably the collar 56 has internal splines engaging external splines formed on the end of the input shaft 50. The collar 56 is able to translate between a first position which only engages the input shaft 50 and a second position to engage both the input shaft 50 and the output shaft 52. The output shaft 52 also has external splines for engagement with the internal splines of the collar 56. When in this second position, the collar 56 serves to provide a positive driving connection between the input 50 and output 52 shafts.

A hydraulically actuated piston 58 is provided to actuate the collar 56 between the first disconnect position and the second connected position. The piston 58 is slidably shiftable within a hydraulic chamber. The hydraulic chamber is defined by a sleeve 66 mounted about the axle housing 54.

Pressurized fluid is provided to first and second opposite ends 60/62 of the chamber to act upon respective first and second ends of the piston 58 to force the piston to move between the first and second positions. When pressurized fluid is supplied to the first end 60 of the chamber, the piston 58 is forced to the right as shown in FIG. 2b. Consequently, the collar 56 is simultaneously forced to the right to engage both the input 50 and output 52 shafts to form the positive connection there between. When pressurized fluid is supplied to the second opposite end 62 of the chamber, the piston 58 and collar 56 is forced to the left thereby disconnecting the collar 56 from the output shaft 52 and allowing relative rotation of the output shaft 52 with respect to the input shaft 54. Such disconnect removes the powerline drive to the output shaft 52 and consequently to a wheel body attached to the output shaft 52. Thus it can be seen that actuation/shifting of the piston 58 within the chamber provides the ability to selectively establish a connection between the input 50 and outputs 52 shafts as well as a disconnect there between.

As can be further seen in FIGS. 2a & 2b, the sleeve 66 is mounted about the external surface of the axle housing 54 to define the hydraulic chamber there between. As previously mentioned, the piston 58 is disposed within the chamber, between the sleeve 66 and axle housing 54 and is translatable between the first connect position (as shown in FIG. 2a) and the second disconnect position (as shown in FIG. 2b). In order to provide a seal between the first end of the chamber 60 and the second end of the chamber 62, a pair of seals are disposed one each in an annular recess formed in the piston 58 adjacent each end thereof. These seals provide a seal between the sleeve 66 and the piston 58. Similarly, a pair of annular seals are disposed one each in a pair of annular recessed formed in the outer surface of the axle housing 54 to form a seal between the piston 58 and the axle housing 54. Such an arrangement separates the first end of the chamber 60 from the second end 62 such that when pressurized fluid is supplied to the first end 60 of the chamber, the piston 58 is forced to the second end 62 and the input 50 and output 52 shafts are connected. When pressurized fluid is supplied to the second end of the chamber 62, the piston 58 is forced to the first end of the chamber 60 to disconnect the input 50 and output 52 shafts.

Rather than provide a separate and additional hydraulic circuit and pump, the present invention contemplates the use of a vehicle's existing lubricating oil pump 84 to provide pressurized fluid to actuate the pistons. Pressurized fluid from the vehicle's oil pump 84 is simply fed to a valve body 80 via passage 84a for selective delivery to each of the first, and second ends of the chamber. A controller 82 is provided to control the valve body 80 in accordance with a desired connect/disconnect mode for the input 50 and output 52 shafts. The valve body 80 may be any type of controllable valve device capable selectively delivering pressurized fluid to one of two separate flow paths. The controller 82 simply controls the valve 80 to deliver pressurized fluid to either of these flowpaths.

The controller 82 may interact or be incorporated into the vehicle's electronic control unit or may be separate to interact with a manual switch. When four wheel drive is desired, the controller 82 acts in a connect mode and controls the valve 80 to deliver pressurized fluid from the oil pump 84 to the first end of the chamber 60 via flowpath 70. The valve body 80 simultaneously connects the second end of the chamber 62 via flow path 72 to an exhaust circuit 74 leading to an oil sump 76 or other reservoir for the lubricating oil. Consequently, the piston 58 together with the collar 56 is forced to the right to interconnect the input 50 and output 52 shafts. Similarly, when two wheel drive is desired, the controller 82 shifts the valve body 80 to direct pressurized fluid to the second end of the chamber 62 via flowpath 72 and simultaneously establish communication of the first end of the chamber 60 with the exhaust circuit 74 leading to the sump or reservoir. Consequently, the piston 58 and collar 56 are forced to disconnect the input 50 and output 52 shafts and remove positive drive to the output shaft 52 and connected wheel body.

Of course, it is noted that FIGS. 2a & 2b only depicts the disconnect assembly leading to one output shaft 52 leading to one of the wheels 28 as is in the preferred embodiment. However, two disconnects assemblies could be employed to disconnect each wheel 28 from the driveline. In such an arrangement a second disconnect assembly is arranged on an opposite side of the differential 26 to simultaneously disconnect or connect each or the output shafts leading to the wheels 28. However, a single controller would be employed to control each disconnect assembly.

Figure 3:
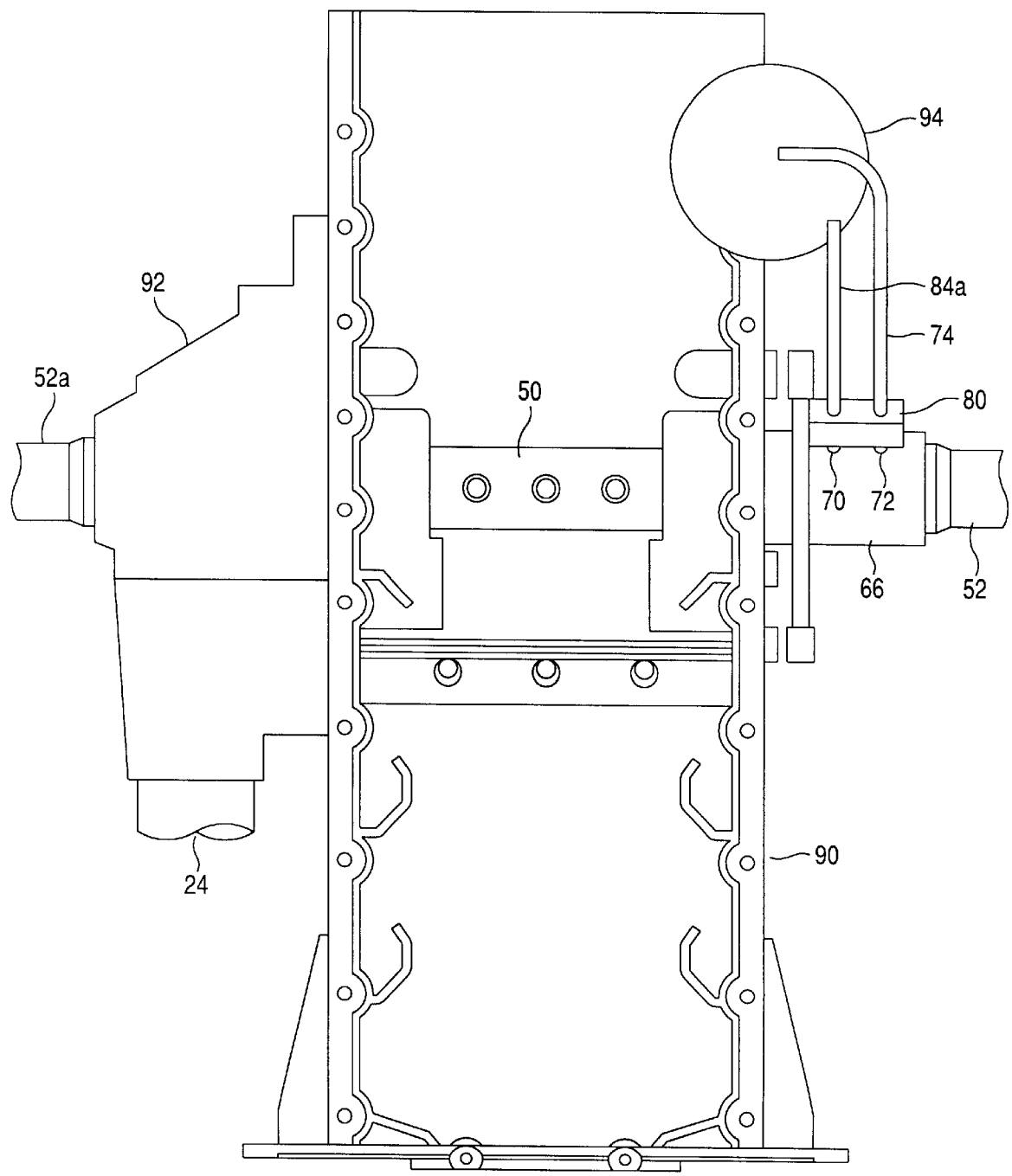
FIG. 3 is a plan view of the present axle disconnect assembly integral with an engine oil pan.

FIG. 3 depicts the disconnect assembly of the present invention in its preferred arrangement. FIG. 3 depicts an engine's oil pan 90 with the axle disconnect and axle assembly 92 directly attached thereto. The differential axle assembly 92 is secured to one side of the oil pan 90. A first shaft emerges from the differential 90, (previously referred to as the disconnect input shaft 520 and passes through the oil pan to an opposite side and engages the disconnect assembly of the present invention. The outer sleeve 66 of the disconnect assembly is shown on the opposite side of the oil pan from the differential/axle assembly 92. The valve body 80 and flowpaths 70/72 are also depicted. In this arrangement, the oil passage 84a leads directly from the oil pump and the exhaust circuit 74 leads directly to the oil filter 94. This arrangement provides only a single disconnect that selectively disconnects output shaft 52 from the differential assembly 92. The opposite axle shaft 52a remains connected to the differential/axle assembly 92.

While the foregoing invention has been shown and described with reference to a preferred embodiment, it will be understood by those possessing skill in the art that various changes and modifications may be made without departing from the spirit and scope of the invention For example, while the aforementioned embodiment has been described for a wheel end disconnect, the disconnect assembly may be employed to disconnect separate portions of a drive shaft.

What is claimed is:

1. An axle disconnect assembly for a vehicle comprising:

an input shaft;

a output shaft coaxially arranged proximate said input shaft;

a collar engaging one of said input and said output shafts, said collar slidable to engage another of said input and said output shafts and establish a positive driving connection between said input and output shafts;

a movable piston engaging said collar;

a valve in communication with a oil pump of said vehicle, said valve being controlled to selectively supply pressurized oil from said oil pump to opposite sides of said piston to selectively displace said piston and thereby selectively control a position of said collar and said connection between said shafts; and a controller to selectively control said valve body between a connect mode and a disconnect mode; and said piston is disposed within and translatable within a chamber between opposite sides thereof, wherein when in said connect mode, said controller operates said valve body to establish communication of said pressurized fluid source to a first one of said opposite sides of chamber and establishes fluid communication of a second one of said opposite sides of said chamber to an exhaust port thereby moving said piston together with said collar to engage both said input and output shafts and when in a disconnect mode said controller operates said valve body to establish communication of said pressurized fluid source to said second one of said opposite sides of said chamber and establishes fluid communication of said first one of said opposite sides of said chamber to said exhaust port thereby moving said piston together with said collar to disengage one of said input and output shafts.

2. The axle disconnect assembly according to claim 1, wherein said piston has an annular extension disposed within an annular recess formed in said collar to form a connection there between.

3. The axle disconnect assembly according to claim 1, wherein said collar is an annular member disposed about at least one of said input and said output shafts and has internal splines adapted to simultaneously engage external splines formed on each of said input and output shafts to from said driving connection.

4. The axle disconnect assembly according to claim 3, wherein said piston has an annular extension disposed within an annular recess formed in said collar to form a connection there between.

5. The axle disconnect assembly according to claim 1, wherein said input and output shafts are rotatably supported within an axle housing; said chamber being defined by said axle housing and a sleeve mounted thereabout.

6. The axle disconnect according to claim 5, wherein said piston has a pair of o-rings one each disposed in a recess formed adjacent each of said opposite sides thereof to form a seal between said piston and an inner surface of said sleeve, said axle housing having a pair of o-rings disposed one each in a recess formed on an outer surface of said axle housing proximate said opposite sides of said chamber to form a seal between said axle housing and said piston.

7. An axle disconnect assembly, comprising:
   an axle housing rotatably supporting an input axle shaft and an output axle shaft, a collar non-rotatably and translatably mounted on one of the input and output axle shafts, said collar adapted to translate between a first position where collar drivingly engages one of the input and output axle shafts and a second position where the collar engages both said input and output axle shafts to form a driving connection there between;
   a movable piston engaging said collar, said piston adapted to shift said collar between the first position and the second position;
   a valve in communication with an existing oil pump of said vehicle, said valve being controlled to selectively supply pressurized oil from said existing oil pump to opposite sides of said piston to selectively move said piston thereby selectively translating said collar between said first and second positions; and
   a controller to selectively control said valve body between a connect mode and a disconnect mode; and said piston is disposed within and translatable within a chamber between opposite sides thereof; wherein when in said connect mode, said controller operates said valve body to establish communication of said pressurized fluid source to a first one of said opposite sides of chamber and establishes fluid communication of a second one of said opposite sides of said chamber to an exhaust port thereby moving said piston together with said collar to engage both said input and output shafts and when in a disconnect mode said controller operates said valve body to establish communication of said pressurized fluid source to said second one of said opposite sides of said chamber and establishes fluid communication of said first one of said opposite sides of said chamber to said exhaust port thereby moving said piston together with said collar to disengage one of said input and output shafts.

8. The axle disconnect of claim 7, wherein said collar is a tubular member disposed about and splined onto said input shaft and selectively splined onto said output shaft.

9. An axle disconnect for an auxiliary drive axle having a differential comprising:
   an axle housing directly attached to an engines oil pan and rotatably supporting first and second coaxial axle shafts end-to end, the coaxial axle shafts having external clutch teeth at adjacent ends,
   a collar rotatably and translatably disposed in the axle housing and coaxially arranged with respect to the coaxial axle shafts, the clutch sleeve having internal clutch teeth slidably engaging the external clutch teeth of at least one of the first and second coaxial axle shafts so that the clutch sleeve translates between a first position where the internal teeth engage the external teeth of the other of the first and second coaxial axle shafts and a second position where the integral teeth disengage the external teeth of the other of the first and second coaxial axle shafts, and
   shift means for shifting the collar from the first position to the second position and vice-versa, the shift means comprising,
   a piston slidably disposed within a chamber and engaging said collar for movement together therewith, a valve body in communication with an existing oil pump of said vehicle thereby providing a pressurized fluid source to opposite sides of said chamber, where in when said valve body establishes communication of said pressurized fluid source to a first one of said opposite ends of said chamber said piston together with said piston are forced to said first position and when said valve body establishes communication of said pressurized fluid to a second one of said opposite ends of said chamber said piston together with said collar are forced to said second position; and
   a controller to selectively control said valve body between a connect mode and a disconnect mode; and said piston is disposed within and translatable within a chamber between opposite sides thereof; wherein when in said connect mode, said controller operates said valve body to establish communication of said pressurized fluid source to a first one of said opposite sides of chamber and establishes fluid communication of a second one of said opposite sides of said chamber to an exhaust port thereby moving said piston together with said collar to engage both said input and output shafts and when in a disconnect mode said controller operates said valve body to establish communication of said pressurized fluid source to said second one of said opposite sides of said chamber and establishes fluid communication of said first one of said opposite sides of said chamber to said exhaust port thereby moving said piston together with said collar to disengage one of said input and output shafts.

* * * * *